(12) United States Patent
Takahashi et al.

(10) Patent No.: US 7,832,424 B2
(45) Date of Patent: Nov. 16, 2010

(54) COUPLER, FUEL CELL EMPLOYING THE COUPLER AND FUEL CARTRIDGE

(75) Inventors: Kenichi Takahashi, Yokohama (JP); Hideaki Yasui, Yokohama (JP); Hiroyuki Hasebe, Chigasaki (JP); Koichi Kawamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 535 days.

(21) Appl. No.: 11/909,007

(22) PCT Filed: Mar. 23, 2006

(86) PCT No.: PCT/JP2006/305847

§ 371 (c)(1),
(2), (4) Date: Sep. 18, 2007

(87) PCT Pub. No.: WO2006/104014

PCT Pub. Date: Oct. 5, 2006

(65) Prior Publication Data
US 2009/0239126 A1 Sep. 24, 2009

(30) Foreign Application Priority Data
Mar. 29, 2005 (JP) .............................. 2005-095467

(51) Int. Cl.
*F16L 37/30* (2006.01)
*H01M 8/04* (2006.01)

(52) U.S. Cl. .............................. 137/614.03; 137/614.05; 251/149.1; 251/368; 429/34

(58) Field of Classification Search .................... 137/ 614.03–614.05; 251/149.1, 149.6, 368; 429/34, 429/39
See application file for complete search history.

(56) References Cited

U.S. PATENT DOCUMENTS

| 6,651,955 B2* | 11/2003 | Anderson ................. 251/149.1 |
| 7,059,582 B2* | 6/2006 | Adams et al. ............ 251/149.6 |
| 7,174,914 B2* | 2/2007 | Ooishi et al. ........... 137/614.03 |

FOREIGN PATENT DOCUMENTS

| JP | 60 121388 | 6/1985 |
| JP | 62 13289 | 1/1987 |
| JP | 62 75295 | 5/1987 |
| JP | 2000 106201 | 4/2000 |
| JP | 2003 203660 | 7/2003 |
| JP | 2005 5155 | 1/2005 |
| JP | 2005 63726 | 3/2005 |
| KR | 94-0000720 | 6/1993 |
| KR | 10-0492926 | 5/2005 |

* cited by examiner

*Primary Examiner*—Kevin L Lee
(74) *Attorney, Agent, or Firm*—Oblon, Spivak, McClelland, Maier & Neustadt, L.L.P.

(57) ABSTRACT

A coupler including a nozzle and a socket. The nozzle includes a nozzle body, a movable pin, and a first supporting member. The movable pin is made retractably movable in the axial direction in a nose portion to open and close the channel inside the nozzle. The socket includes a housing, a collar, a ring-like packing, a valve stem, a valve head, and a second supporting member. The valve stem is made retractably movable in the socket in the axial direction to open and close the channel inside the socket. All portions or components which contact liquid fuel in the coupler are formed solely of rubber and/or plastics.

13 Claims, 10 Drawing Sheets

Influence of minute Al contamination of fuel on deterioration of output characteristics

COUPLER, FUEL CELL EMPLOYING THE COUPLER AND FUEL CARTRIDGE

TECHNICAL FIELD

This invention relates to a coupler which is constituted by a nozzle, and a socket on which the nozzle is to be mounted, the coupler being employed for delivering liquid from the nozzle to the socket. In particular, this invention relates to a coupler which is designed to be employed for detachably attaching a fuel cartridge to a tank of passive fuel cell on the occasion of replenishing the fuel tank with methanol from the fuel cartridge.

BACKGROUND ART

In recent years, the employment of a fuel cell as a power source for various kinds of mobile instruments such as a laptop computer, a cellular phone, etc. has been extensively practiced in order to enable these mobile instruments to be used for a long period of time without necessitating the charging of the power source. This fuel cell is featured in that the generation of power can be effected therein simply through the feeding of fuel and air thereto, so that it is possible to continuously generate electric power for a long period of time as long as it is replenished with only fuel. Therefore, if it is possible to miniaturize the fuel cell, it will become a very advantageous system for use as a power source for these mobile instruments.

Especially, in the case of a direct methanol fuel cell (DMFC), since methanol having a high energy density is employed as a fuel and an electric current is directly extracted from methanol by making use of a catalytic layer and a solid electrolyte film, it no longer requires the employment of a reformer, thus making it possible to miniaturize the fuel cell, and, at the same time, the handling of fuel is easier as compared with hydrogen gas, thus making it more advantageous as a power source for use in a small mobile instrument. As for the fuel supply system of DMFC, there are known various types, including a gas supply type DMFC wherein a liquid fuel is vaporized and delivered into the fuel cell by means of a blower, etc.; a liquid supply type DMFC wherein a liquid fuel is delivered as it is into the fuel cell by means of a pump, etc.; and an internal vaporization type DMFC wherein the liquid fuel delivered into the fuel cell is vaporized therein and then fed to the fuel electrode thereof.

As described in JP-A 2000-106201 (KOKAI), the internal vaporization type DMFC is provided with a fuel penetration layer for retaining liquid fuel, and with a fuel vaporization layer for diffusing a vaporized fuel component out of the liquid fuel retained in the fuel penetration layer, thereby enabling the vaporized fuel to be fed from the fuel vaporization layer to the fuel electrode. According to the above-described document, an aqueous solution of methanol consisting of a 1:1 molar mixture of methanol and water is employed as the liquid fuel, and both of methanol and water are turned into a gaseous state before they are fed to the fuel electrode. However, the fuel cell wherein an aqueous solution of methanol is employed as liquid fuel as described above is accompanied with a problem that, due to a difference in vaporization rate between methanol and water, it is difficult to derive sufficient output characteristics. Under the circumstances, in the attempts to enhance the output characteristics of the fuel cell and to further miniaturize the fuel cell, the development of the fuel cell using pure methanol as fuel is now extensively studied.

As for the small fuel cell which is mainly designed to be used in a mobile instrument, a passive fuel cell is now being developed, wherein pure methanol is employed as fuel without necessitating any active transferring means such as a fuel pump for delivering the pure methanol to the fuel electrode. In the case of this passive fuel cell, in order to facilitate the operation to feed pure methanol from a fuel cartridge to the fuel tank mounted on the fuel cell, a quick disconnecting type coupler is employed at a portion of the fuel tank which is adapted to be connected with the fuel cartridge. This quick disconnecting type coupler is constructed such that it is constituted by a couple of coupling members in each of which a valve is incorporated. Each of these valves is designed to be actuated such that, under the condition where the coupling member is disconnected from the fuel cartridge, the channel inside each of coupling members is closed and, under the condition where the coupling member is connected with the fuel cartridge, the channel inside each of coupling members is opened. In this quick disconnecting type coupler which is constructed as described above, a steel spring is generally installed in the interior of each of the coupling members in order to make it possible to open or close the valve in conformity with the connection or disconnection of the coupling member in relation to the fuel cartridge.

Incidentally, there is a problem in the case of the fuel cell where pure methanol is employed as fuel that, if the methanol is contaminated with metal ions, the metal ions are permitted to be captured by the solid electrolyte film constituting an electrode film structure, thereby resulting in the deterioration in output of the fuel cell. Especially, in the case of a small fuel cell for use in a mobile instrument, since methanol is directly fed from the fuel cartridge to the fuel tank mounted on the main body of fuel cell and the methanol in the fuel tank is then fed, as it is, to the electrode film structure without being subjected to any special pre-treatment. Therefore, it is necessary, to the greatest extent possible, to avoid the contamination of methanol with the metal ions.

However, when a quick disconnecting type coupler is used at a junction between the fuel tank and the fuel cartridge, metal ions are permitted to elute into pure methanol from a metallic member included in the components of the valve, thereby giving rise to the deterioration of the electrode film structure. Especially, aluminum ions originating from a minute amount of aluminum contained in steel is harmful.

DISCLOSURE OF INVENTION

The present invention has been accomplished with a view to overcoming the aforementioned problems associated with the quick disconnecting type coupler to be employed for connecting a fuel cartridge with the fuel tank of passive fuel cell.

Therefore, an object of the present invention is to provide a coupler which is capable of preventing the phenomenon of elution of metal ions in liquid fuel on the occasion of replenishing the fuel tank with liquid fuel from the fuel cartridge.

According to the present invention, there is provided a coupler which is constituted by a nozzle, and a socket on which the nozzle is to be mounted, the coupler being employed for delivering liquid from the nozzle to the socket and characterized in that:

the nozzle is provided therein with a first valve which is designed to be actuated such that, under the condition where the nozzle is disconnected from the socket, a channel inside the nozzle is closed and, under the condition where the nozzle is connected with the socket, the channel inside the nozzle is opened; and, the socket is provided therein with a second valve which is designed to be actuated such that, under the condition where the nozzle is disconnected from the socket, a channel inside the socket is closed and, under the condition where the nozzle is connected with the socket, the channel inside the socket is opened;

wherein an inner surface of the nozzle, an inner surface of the socket, all constituent components of the first valve and all constituent components of the second valve are formed solely of rubber and/or plastics.

According to the aforementioned coupler of the present invention, since all portions of the coupler which are caused to contact with a fluid to be passed through a channel formed inside the coupler, i.e. the inner surface of the nozzle, the inner surface of the socket, all constituent components of the first valve and all constituent components of the second valve are formed solely of rubber and/or plastics, there is no possibility that the metal ions are permitted to elute into the fluid passing through the channel of the coupler.

According to a preferable embodiment of the present invention, there is provided a coupler which is constituted by a nozzle, and a socket on which the nozzle is to be mounted, the coupler being employed for delivering liquid from the nozzle to the socket and characterized in that:

the nozzle comprises:

a nozzle body having, at a distal end thereof, a nose portion provided with a nozzle spout;

a movable pin positioned inside the nose portion in such a manner that it is enabled to retractably move in an axial direction such that, when the pin is moved to an advanced position, the nozzle spout is closed by the pin to thereby close a channel inside the nozzle and, when the pin is moved to a retracted position, the pin is separated away from the nozzle spout to thereby open the channel inside the nozzle; and a first supporting member is attached to a rear end portion of the movable pin and is fixed, through the outer periphery thereof, to the nozzle body, the first supporting member being formed of a flange-shaped elastic material which is configured to push the movable pin toward the advanced position;

the socket comprises:

a cylindrical housing provided, on the inner wall thereof, with an annular rib portion extending diametrally inward;

a collar formed of an elastic material, placed inside the housing and at a region of the housing which is located further out, in the axial direction, than where the annular rib is located, and sustained, through the rear end face thereof, by the outer sidewall of the annular rib;

a ring-like packing placed inside the housing and at a region of the housing which is located further in, in the axial direction, than where the annular rib is located, and sustained, through the rear surface thereof, by the inner sidewall of the annular rib;

a valve stem penetrating through the collar, the annular rib and the ring-like packing and enabled to retractably move in the axial direction;

a valve head attached to approximately the rear end portion of the valve stem and designed to be actuated such that, when the valve stem is moved to an advanced position, the valve head is contacted with the ring-like packing to thereby close a channel inside the socket and, when the valve stem is moved to a retracted position, the valve head is moved away from the ring-like packing to thereby open the channel inside the socket; and a second supporting member attached to a rear end portion of the valve stem and formed of an elastic material which is configured to push the valve stem toward the advanced position;

wherein the coupler is designed to be actuated such that, when the nozzle is mounted on the socket, the junction between the nozzle body and the housing is sealed by the collar while the movable pin is impinged against the valve stem to thereby push one another back to the retracted positions thereof, and consequently the channel inside the nozzle as well as the channel inside the socket is permitted to open; and an inner surface of the nozzle body, an inner surface of the housing, the movable pin, the first supporting member, the collar, the ring-like packing, the valve stem, the valve head, and the second supporting member are all formed solely of rubber and/or plastics.

When the coupler is constructed as described above, it is possible to reduce the number of parts to be incorporated in the nozzle and in the socket. Further, since not only the first supporting member for pushing the movable pin toward the advanced position but also the second supporting member for pushing the valve stem toward the advanced position can be all formed solely of rubber and/or plastics, it is possible to prevent the phenomenon of metal ions eluting into a fluid passing through the coupler.

Preferably, the inner surface of the nozzle body, the inner surface of the housing, the valve stem and the valve head are all formed of at least one kind of resin selected from the group consisting of PEEK (polyetherether ketone), PPS (polyphenylene sulfide), LCP (liquid crystal polymer), PBT (polybutylene terephthalate), POM (polyacetal) and PET (polyethylene terephthalate). The movable pin, the first supporting member, the collar, the ring-like packing and the second supporting member, on the other hand, can be formed of at least one kind of rubber selected from the group consisting of EPDM (ethylene-propylene-diene), NBR (acrylonitrile-butadiene rubber), FKM (fluororubber) and VMQ (silicone rubber).

Incidentally, the construction of the nozzle in the aforementioned coupler may be partially modified in such a manner that an elastic ball is substituted for the movable pin. In this case, the nozzle may be constituted by:

a nozzle body having a nozzle spout at a distal end thereof;

an elastic ball placed in the nozzle body; and a back plate which is fixed to a rear end of the nozzle body and designed to be actuated such that it supports and pushes the elastic ball from the back thereof to force the elastic ball to press onto the nozzle spout to thereby close the channel inside the nozzle.

When the nozzle is constructed in this manner, under the condition where the nozzle is to be mounted on the socket, the junction between the nozzle body and the housing is sealed by the color while the elastic ball is impinged against the valve stem, thereby the elastic ball is compressed and moved away from the nozzle spout and, at the same time, the valve stem is pushed back to the retracted position, and consequently permitting the channel inside the nozzle and also the channel inside the socket to open.

According to the coupler of the present invention, since all portions of the coupler which are caused to contact with a fluid to be passed through a channel formed inside the coupler are formed solely of rubber and/or plastics, there is no possibility that the metal ions are permitted to elute into the fluid passing through the channel of the coupler.

When the coupler of the present invention is employed at the junction between the fuel tank mounted on the main body of fuel cell and the fuel cartridge in the passive fuel cell, it is possible to prevent the phenomenon of deteriorating the output of fuel cell that, otherwise, may be caused to occur due to the elution of metal ions in liquid fuel.

BEST MODE FOR CARRYING OUT THE INVENTION

First of all, the influence of a minute amount of aluminum ions included in pure methanol employed as liquid fuel on the output characteristics of passive fuel cell will be explained as one example in FIG. 1.

In this data, the changes ($\Delta V$) in output voltage with time of power generation are plotted in connection with the quantity of aluminum eluted into methanol and employed as a parameter. The construction of the electrode film structure employed in this fuel cell is as follows: a solid electrolytic film=Naphyon (product name: Du Pont); a fuel electrode catalytic layer=Pt—Ru (platinum-ruthenium) and an air electrode catalytic layer=Pt (platinum). The dimensions of the electrode film structure are: 32 mm (height)×32 mm (width)×1 mm (thickness). By making use of this fuel cell, the generation of power was performed under the conditions of: 150 mA/cm$^2$ at constant current.

Figure 1:
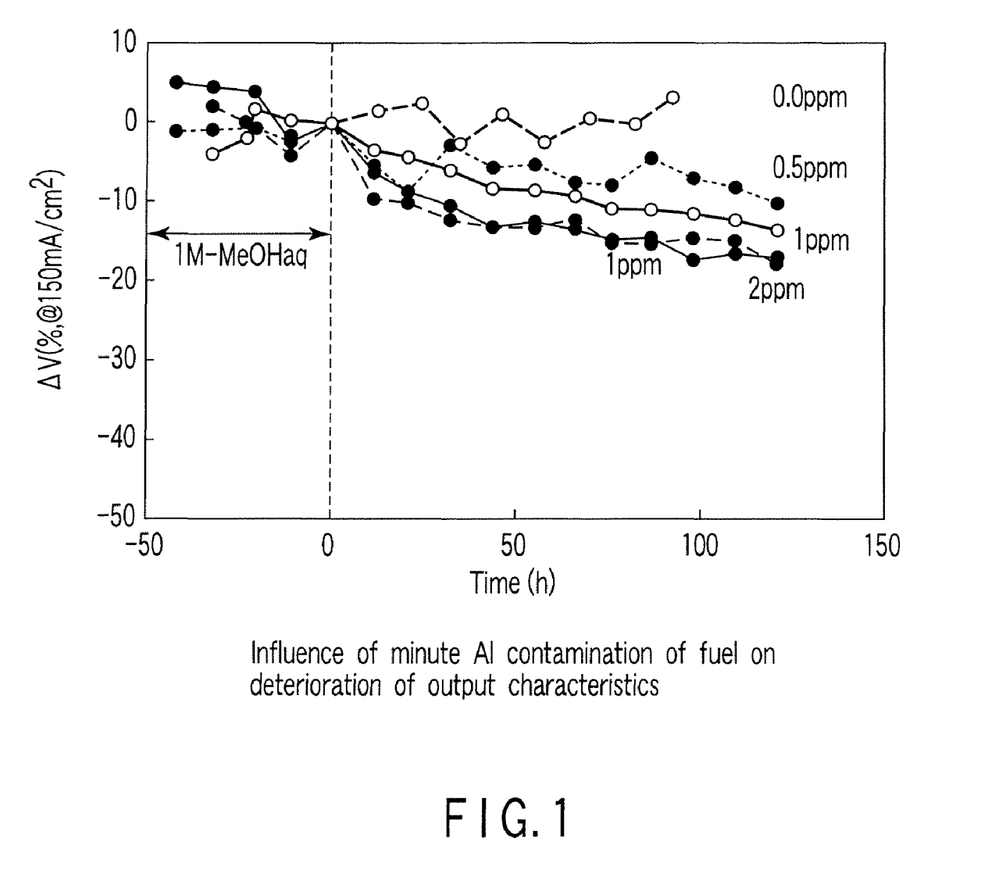
FIG. 1 is a graph showing one example which explains the influence of a minute amount of aluminum ions included in pure methanol on the output characteristics of a passive fuel cell.

As shown in FIG. 1, it will be realized that even if the quantity of aluminum ions contained in pure methanol is negligible, it gives harmful effects to the output characteristics of a fuel cell.

Example 1

Figure 2:
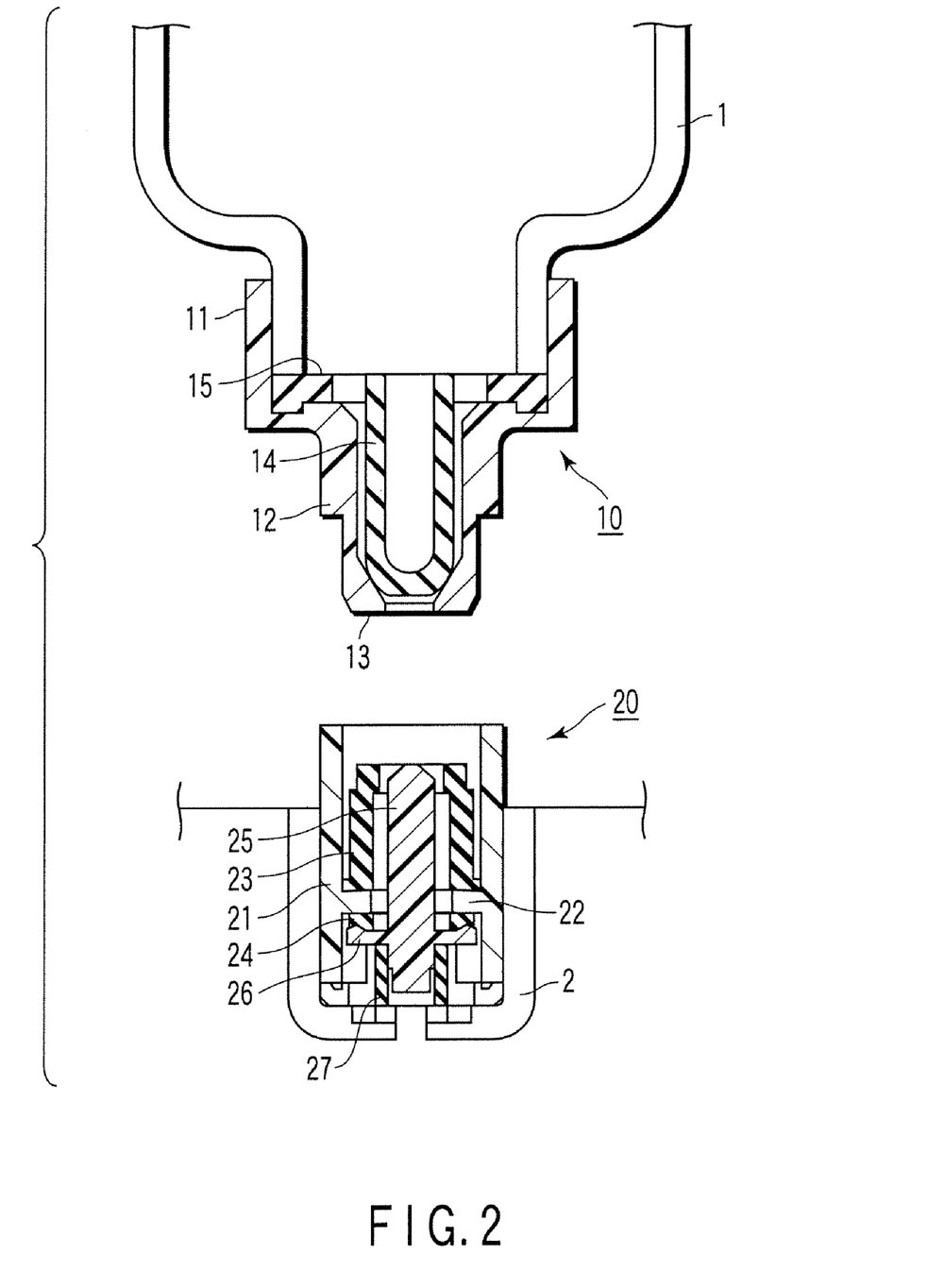
FIG. 2 is a longitudinal sectional view showing one embodiment of the coupler (the state thereof before the connection) according to the present invention.
Figure 3:
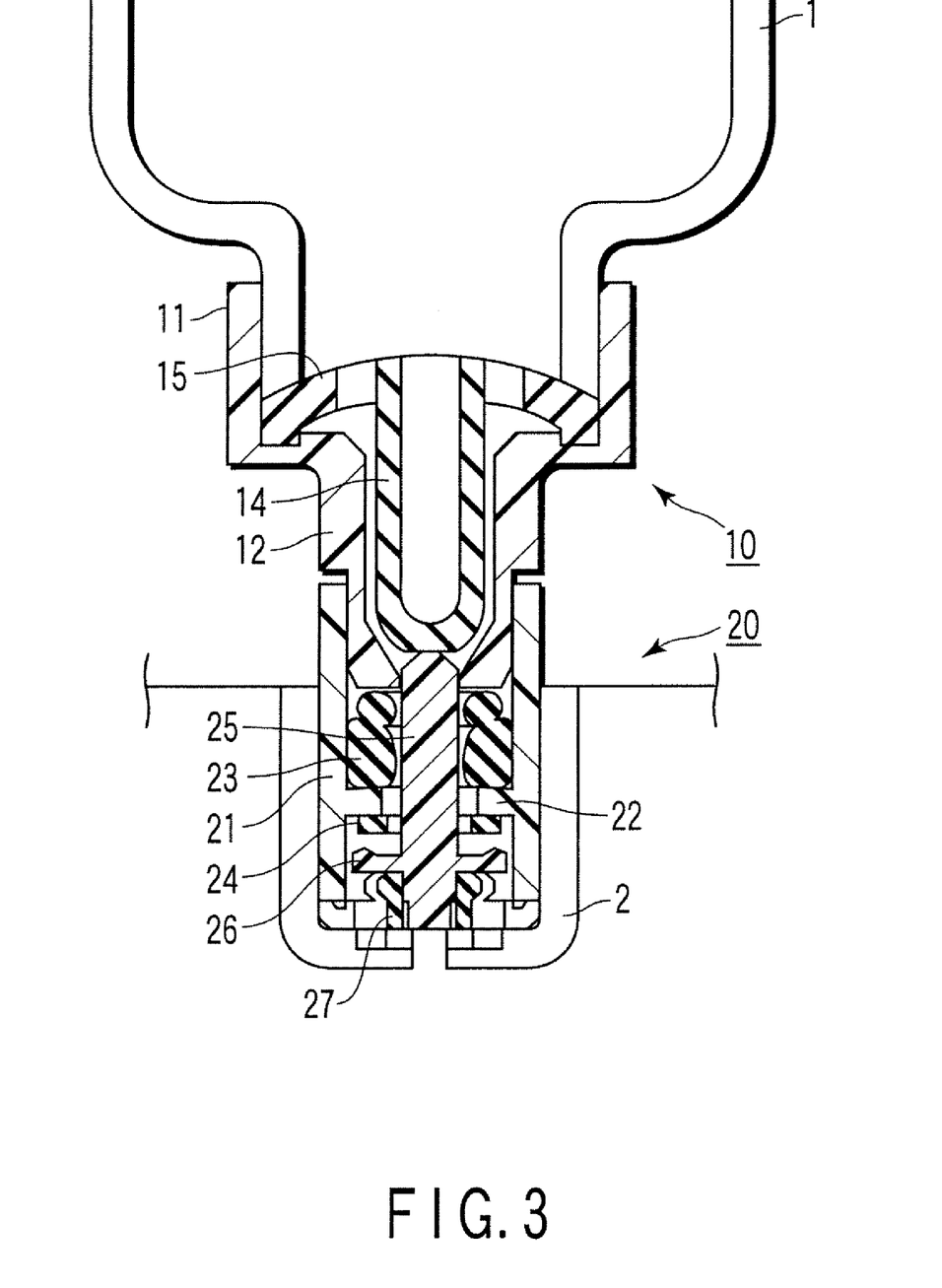
FIG. 3 is a longitudinal sectional view showing one embodiment of the coupler (the state thereof after the connection) according to the present invention.

FIGS. 2 and 3 illustrate one example of the coupler according to the present invention. Namely, FIG. 2 illustrates a state of the coupler before the assembling thereof, and FIG. 3 illustrates a state of the coupler after the assembling thereof. This collar is employed in a passive fuel cell for connecting a fuel tank mounted on the main body of the fuel cell with a fuel cartridge.

In these drawings, 10 denotes a nozzle; 20, a socket; 11, a nozzle body; 12, a nose portion; 13, a nozzle spout; 14, a movable pin; 15, a first supporting member; 21, a housing; 22, a ring-like rib; 23, a collar; 24, a ring-like packing; 25, a valve stem; 26, a valve head; and 27, a second supporting member.

This coupler is constituted by the nozzle 10 and the socket 20. The nozzle 10 is designed to be attached to the mouth portion of cartridge bottle 1 and the socket 20 is designed to be attached to the inlet port 2 of fuel tank. Liquid fuel (for example, pure methanol) is delivered from the nozzle 10 to the socket 20.

The main portion of the nozzle 10 is constituted by the nozzle body 11, the movable pin 14 and the first supporting member 15. The nozzle body 11 is provided with the nose portion 12 and the nozzle spout 13 is formed at a distal end of this nose portion 12. The movable pin 14 is disposed inside the nose portion 12. This movable pin 14 is enabled to retractably move in the axial direction in the nose portion 12 in such a manner that, when this movable pin 14 is disposed at the advanced position, it shuts off the nozzle spout 13 to thereby close the channel inside the nozzle and, when this movable pin 14 is disposed at the retracted position, it moves away from the nozzle spout 13 to thereby open the channel inside the nozzle.

A rear-end portion of the movable pin 14 is fixed, through the first supporting member 15, to the nozzle body 11. This first supporting member 15 is formed of a flange-shaped elastic material and connected, through the outer circumferential wall thereof, with the nozzle body 11. Further, this first supporting member 15 is connected, through the inner circumferential wall thereof, with a rear-end portion of the movable pin 14. This first supporting member 15 is designed to be actuated such that, when the nozzle 10 is separated away from the socket 20, it pushes the movable pin 14 to the advanced position to close the channel inside the nozzle. Further, this first supporting member 15 is also enabled to act as a sealing member for sealing the junction between the mouth of cartridge bottle 1 and the nozzle body 11.

The main portion of the socket 20 is constituted by the housing 21, the collar 23, the ring-like packing 24, the valve stem 25, the valve head 26 and the second supporting member 27.

The housing 21 is of an approximately cylindrical configuration and is provided, on an inner circumferential wall thereof, with an annular rib 22 which is projected diametrally inward from a middle portion, in height, of the inner circumferential wall thereof. The housing 21 is also provided therein with the collar 23 formed of an elastic material and disposed at a region of the housing which is located further out, in the axial direction, than where the annular rib 22 is located (i.e. a region of the housing which is located close to the inlet of the socket). A rear-end portion of the collar 23 is sustained by the outer sidewall of the annular rib 22 (i.e. the sidewall which is located close to the inlet of the socket). Further, the housing 21 is also provided therein with the ring-like packing 24 which is disposed at a region of the housing which is located further in, in the axial direction, than where the annular rib is located (i.e. an inner region of the socket). The back side of this ring-like packing 24 is sustained by the inner sidewall of the annular rib 22 (i.e. the sidewall of the annular rib 22 which is located at an inner region of the socket).

The valve stem 25 is disposed in a cylindrical space surrounded by the collar 23, the rib 22 and the ring-like packing 24. This valve stem 25 is enabled to move retractably in the axial direction in this cylindrical space. In the vicinity of the rear-end portion of the valve stem 25 is attached the valve head 26. This valve head 26 is designed to be actuated in such a manner that, when the valve stem 25 is disposed at the advanced position, the valve head 26 is contacted with the ring-like packing 24 to thereby close the channel inside the socket and, when the valve stem 25 is disposed at the retracted position, the valve head 26 moves away from the ring-like packing 24 to thereby open the channel inside the socket.

A rear-end portion of the valve stem 25 is sustained, through the second supporting member 27, by the bottom of the mouth portion 2 of the fuel tank. This second supporting member 27 is formed of a cylindrical elastic substance and contacted, through one end thereof, with the back surface of the valve head 26 and also contacted, through the other end thereof, with the bottom of the mouth portion 2 of fuel tank. When the nozzle 10 is disengaged from the socket 20, the second supporting member 27 acts to push the valve stem 25 toward the advanced position to thereby close the channel inside the socket.

In the coupler constructed as described above, all portions or components which contact the liquid fuel passing through the interior of coupler, i.e. the inner surface of the nozzle body 11, the inner surface of the housing 21, the movable pin 14, the first supporting member 15, the collar 23, the ring-like packing 24, the valve stem 25, the valve head 26, and the second supporting member 27 are formed solely of rubber and/or plastics.

In this example, the inner surface of the nozzle body 11, the inner surface of the housing 21, the valve stem 25 and the valve head 26 are all formed of the LCP of aromatic resin. The movable pin 14 and the first supporting member 15 are both formed of ethylene-propylene-diene rubber terpolymer (EPDM)(75HS), and the collar 23 and the second supporting member 27 are both formed also of ethylene-propylene-diene rubber terpolymer (EPDM)(50HS). Likewise, the ring-like packing 24 is formed of ethylene-propylene-diene rubber terpolymer (EPDM)(30HS).

Incidentally, the inner surface of the nozzle body 11, the inner surface of the housing 21, the valve stem 25 and the valve head 26 may be all formed of a resin selected from PEEK (polyetherether ketone), PPS (polyphenylene sulfide), LCP (liquid crystal polymer), PBT (polybutylene terephthalate), POM (polyacetal) and PET (polyethylene terephthalate). When these seven kinds of resin were subjected to a static immersion test based on "The method of chemical resistance test of plastics" (JIS-K7114), any change in weight as well as any change in dimension (in the directions of plane and thickness) could not be recognized, thus confirming that these resins were sufficiently resistive to methanol.

On the other hand, the movable pin 14, the first supporting member 15, the collar 23, the ring-like packing 24 and the second supporting member 27 may be all formed of a rubber selected from EPDM (ethylene-propylene-diene), NBR (acrylonitrile.butadiene rubber), FKM (fluororubber) and VMQ (silicone rubber). When these three kinds of rubber were subjected to a static immersion test based on "The method of immersion test of vulcanized rubber" (JIS-K6258), any change in weight, any change in dimension (in the directions of plane and thickness) and any change in load could not be recognized, thus confirming that these rubber materials were sufficiently resistive to methanol.

Next, the operation of this coupler will be explained. FIGS. 4A-4E illustrate the movements of each of constituent components to be effected on the occasion of assembling the coupler.

Figure 4A:
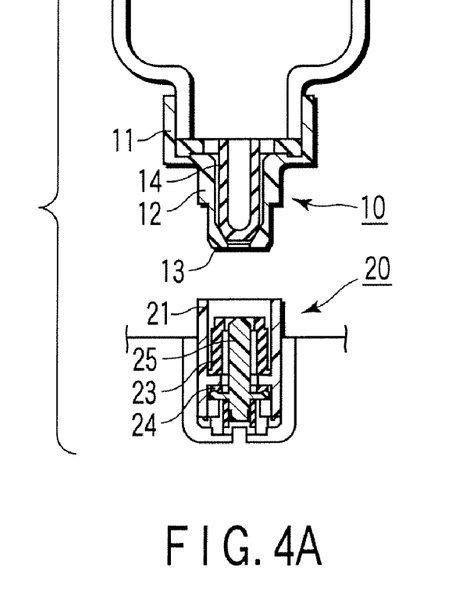
FIG. 4A is a longitudinal sectional view for illustrating the movement of the coupler (the state thereof before the connection) shown in FIGS. 1 and 2.
Figure 4B:
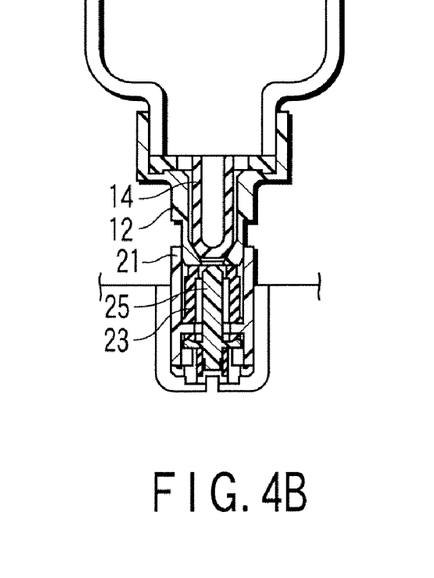
FIG. 4B is a longitudinal sectional view for illustrating the movement of the coupler shown in FIGS. 1 and 2.
Figure 4C:
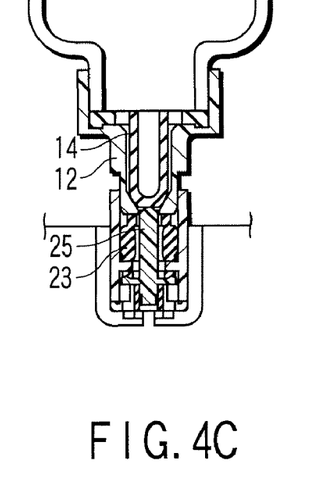
FIG. 4C is a longitudinal sectional view for illustrating the movement of the coupler shown in FIGS. 1 and 2.
Figure 4D:
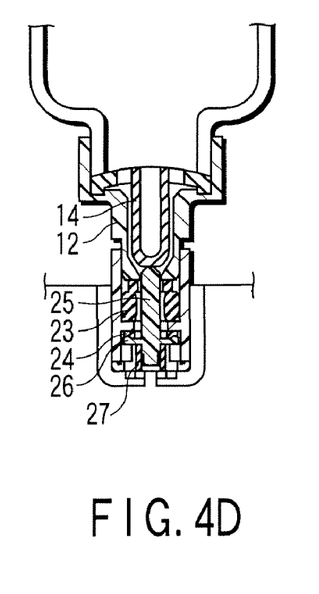
FIG. 4D is a longitudinal sectional view for illustrating the movement of the coupler shown in FIGS. 1 and 2.
Figure 4E:
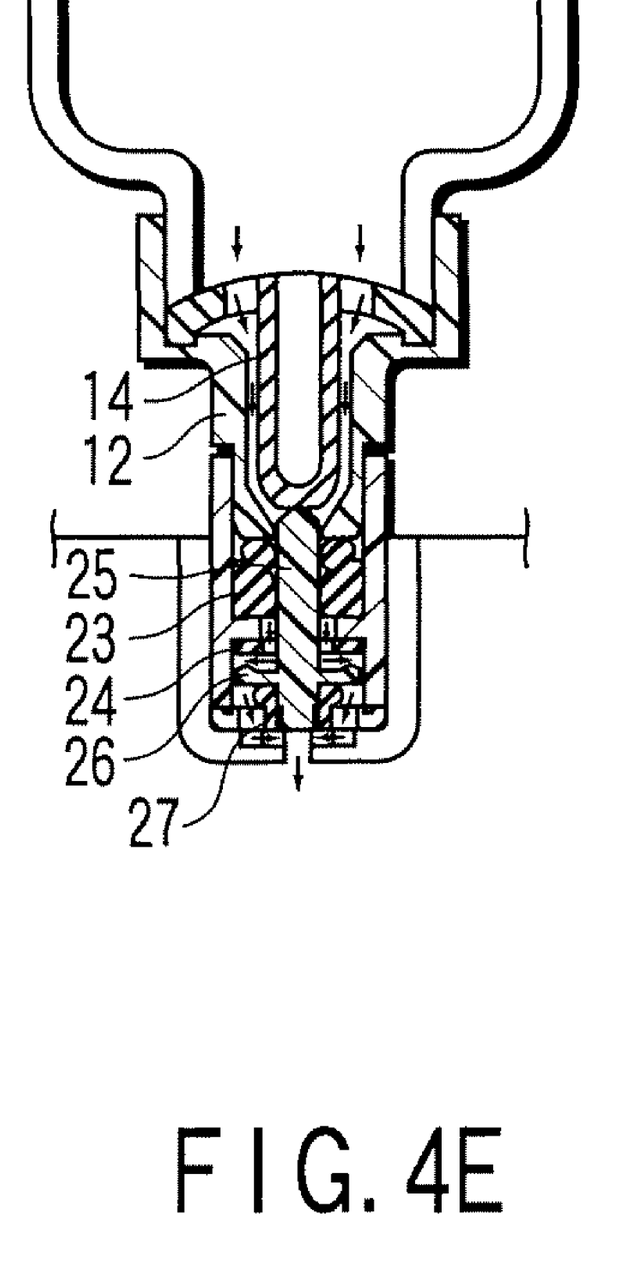
FIG. 4E is a longitudinal sectional view for illustrating the movement of the coupler (the state thereof after the connection) shown in FIGS. 1 and 2.

When the nozzle 10 is pushed into the socket 20 on the occasion of mounting the nozzle 10 on the socket 20, the nose portion 12 is contacted at first with a fore-end face of the collar 23 to thereby seal the junction between the nozzle body 11 and the housing 21 (FIGS. 4A and 4B). When the nozzle 10 is further pushed into the socket 20, the collar 23 is compressed by the nose portion 12, thereby enabling the valve stem 25 to impinge against the movable pin 14 (FIG. 4C) and hence pushing the movable pin 14 back to the retracted position (FIG. 4D). As a result, the channel inside the nozzle is caused to open. When the nozzle 10 is further pushed into the socket 20, the second supporting member 27 is compressed by the movable pin 14 that has been retracted, thus pushing the valve stem 25 back to the retracted position. As a result, the valve head 26 is moved away from the ring-like packing 24, permitting the channel inside the socket to open (FIG. 4E).

According to the construction of the coupler shown in this example, since the nozzle 10 is designed to be closed by press-contacting a distal end of the movable pin 14 with the nozzle spout 13, it is possible to prevent the fuel remaining in the nozzle 10 from leaking out of the nozzle spout 13 on the occasion when the nozzle 10 is dismounted from the socket 20 after the fuel tank has been replenished with fuel from the fuel cartridge.

Further, since the fuel cartridge can be constituted by three parts, i.e. the cartridge bottle 1, the nozzle body 11 and the movable pin 14 (including the first supporting member 15), the manufacturing cost of the fuel cartridge (to be employed as a disposable container) can be reduced.

Example 2

Figure 5:
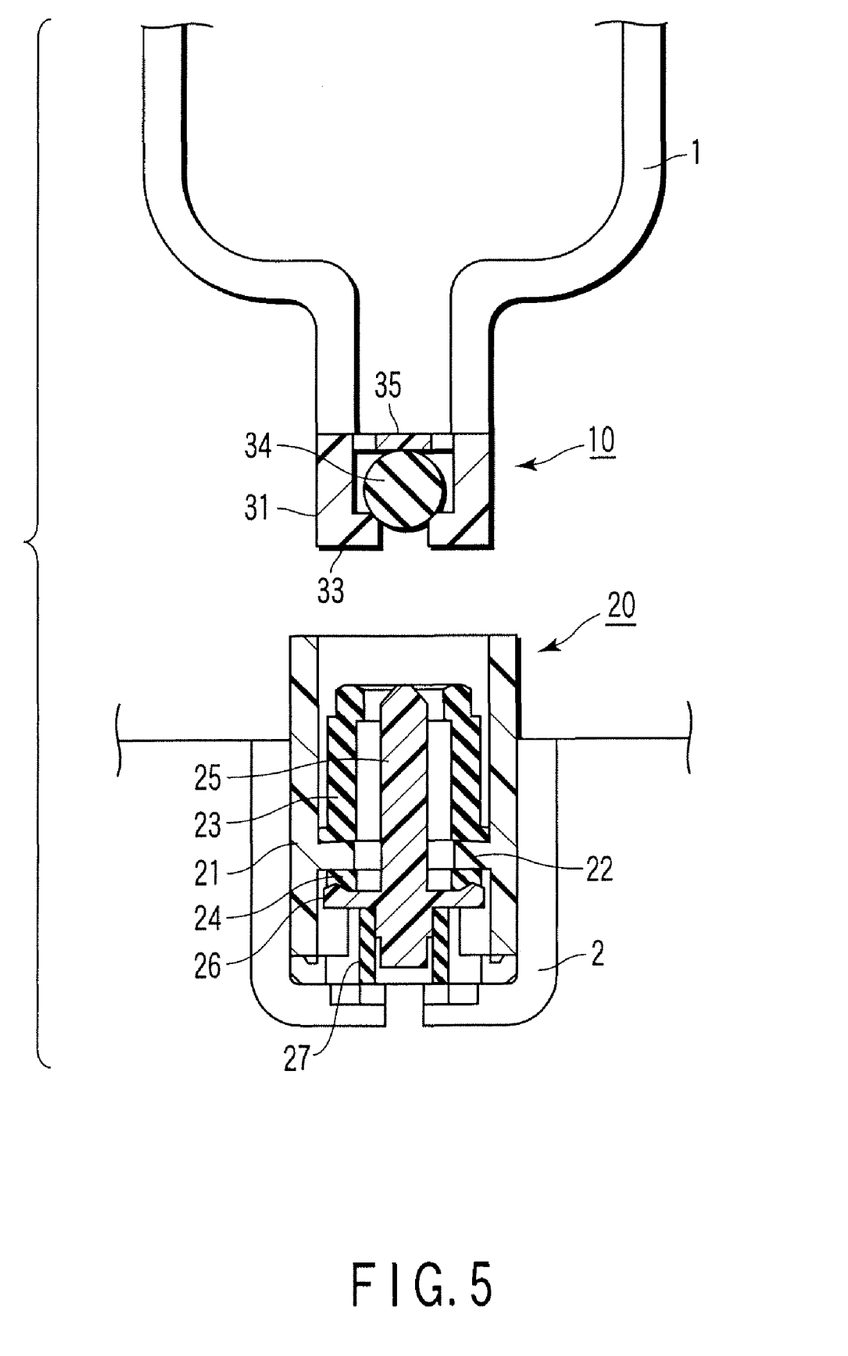
FIG. 5 is a longitudinal sectional view showing another embodiment of the coupler (the state thereof before the connection) according to the present invention.
Figure 6:
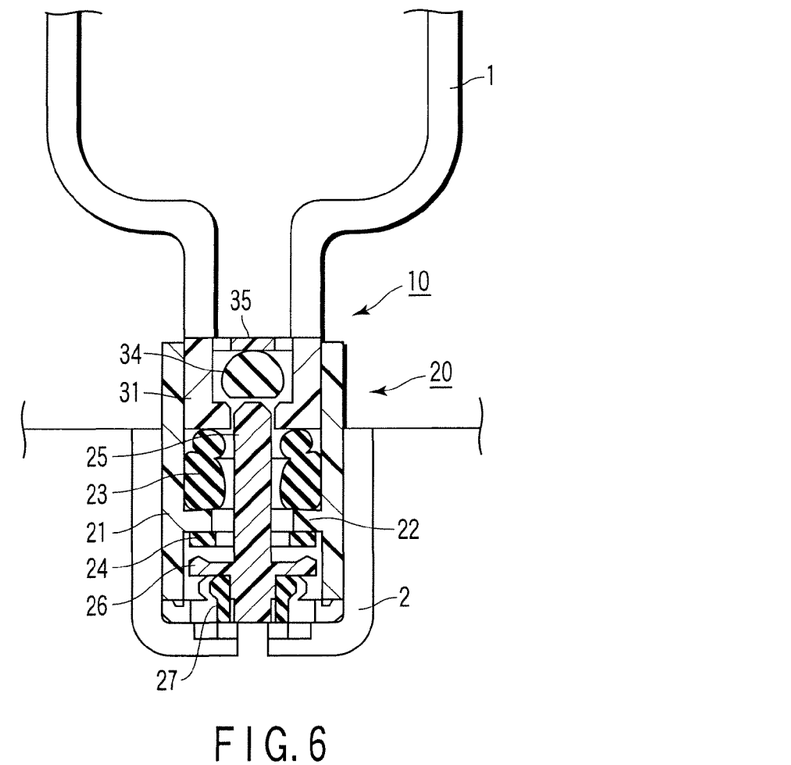
FIG. 6 is a longitudinal sectional view showing another embodiment of the coupler (the state thereof after the connection) according to the present invention.

FIGS. 5 and 6 illustrate another example of the coupler according to the present invention. Namely, FIG. 5 illustrates a state of the coupler before the assembling thereof, and FIG. 6 illustrates a state of the coupler after the assembling thereof. In FIGS. 5 and 6, 31 denotes the nozzle body; 33, the nozzle spout; and 34, the elastic ball.

This example mainly differs from the aforementioned example shown in FIGS. 2 and 3 in that the elastic ball 34 is employed in place of the movable pin 14 and the first supporting member 15 which are employed in the previous example. As for the construction of the socket 20 employed in this example, it is fundamentally the same as that of the previous example. Therefore, the same components as those of the previous example will be identified by the same reference numerals in this example, thereby omitting the explanation thereof.

In this example, the main portion of the nozzle 10 is constituted by the nozzle body 31 and the elastic ball 34. The nozzle body 31 is provided, at a distal end thereof, with the nozzle spout 33. The elastic ball 34 is disposed inside the nozzle body 31. A back plate 35 is secured to a rear-end portion of the nozzle body 31 and the elastic ball 34 is sustained, from the back side thereof, by this back plate 35. When the nozzle 10 is dismounted from the socket 20, the elastic ball 34 is pressed against the nozzle spout 33 by this back plate 35, thereby closing the channel inside the nozzle 10. When the nozzle 10 is connected with the socket 20, the elastic ball 34 is compressed by the valve stem 25 which is built in the socket 20, thereby enabling the elastic ball 34 to move away from the nozzle spout 33, thus permitting the channel inside the nozzle 10 to open.

In the coupler constructed as described above, all portions or components which contact the liquid fuel passing through the interior of coupler, i.e. the inner surface of the nozzle body 31, the inner surface of the housing 21, the elastic ball 34, the back plate 35, the collar 23, the ring-like packing 24, the valve stem 25, the valve head 26, and the second supporting member 27 are formed solely of rubber and/or plastics as in the case of the previous example.

In this example, the inner surface of the nozzle body 31, the back plate 35, the inner surface of the housing 21, the valve stem 25 and the valve head 26 are all formed of the LCP of aromatic resin. The movable pin is formed of ethylene-propylene-diene rubber terpolymer (EPDM)(75HS), and the collar 23 and the second supporting member 27 are both formed also of ethylene-propylene-diene rubber terpolymer (EPDM) (50HS). Likewise, the ring-like packing 24 is formed of ethylene-propylene-diene rubber terpolymer (EPDM)(30HS).

Incidentally, the inner surface of the nozzle body 31, the back plate 35, the inner surface of the housing 21, the valve stem 25 and the valve head 26 may be all formed of a resin selected from PEEK (polyetherether ketone), PPS (polyphenylene sulfide), LCP (liquid crystal polymer), PBT (polybutylene terephthalate), POM (polyacetal) and PET (polyethylene terephthalate). On the other hand, the movable pin, the collar, the ring-like packing and the second supporting member may be all formed of a rubber selected from EPDM (ethylene-propylene-diene), NBR (acrylonitrile-butadiene rubber), FKM (fluororubber) and VMQ (silicone rubber).

Next, the operation of this coupler will be explained. FIGS. 7A-7E illustrate the movements of each of constituent components to be effected on the occasion of assembling the coupler.

Figure 7A:
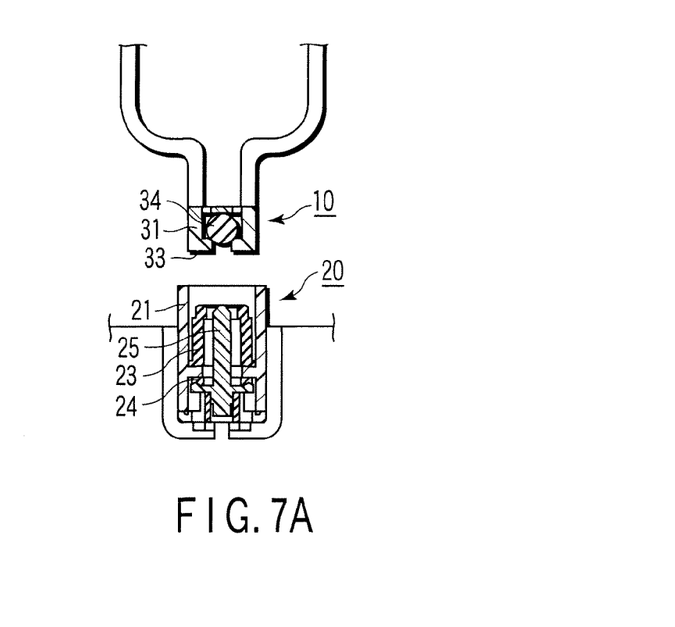
FIG. 7A is a longitudinal sectional view for illustrating the movement of the coupler (the state thereof before the connection) shown in FIGS. 5 and 6.
Figure 7B:
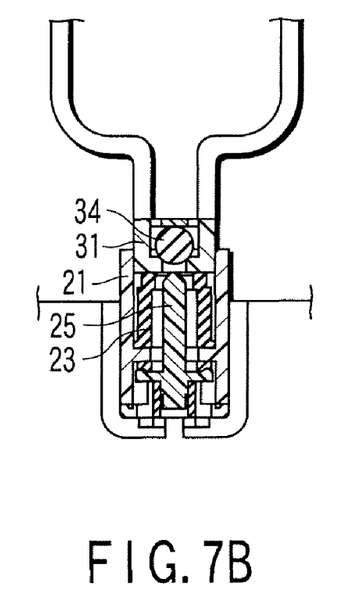
FIG. 7B is a longitudinal sectional view for illustrating the movement of the coupler shown in FIGS. 5 and 6.
Figure 7C:
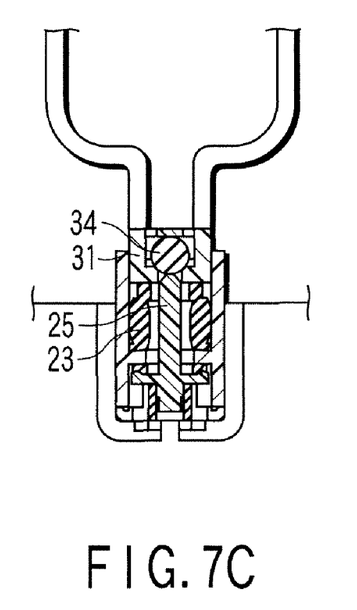
FIG. 7C is a longitudinal sectional view for illustrating the movement of the coupler shown in FIGS. 5 and 6.
Figure 7D:
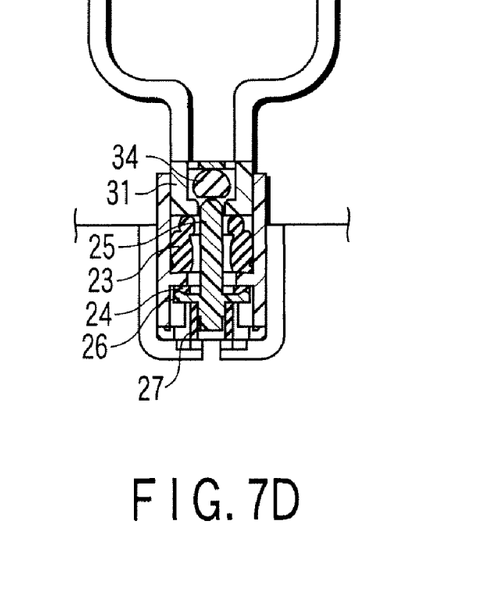
FIG. 7D is a longitudinal sectional view for illustrating the movement of the coupler shown in FIGS. 5 and 6.
Figure 7E:
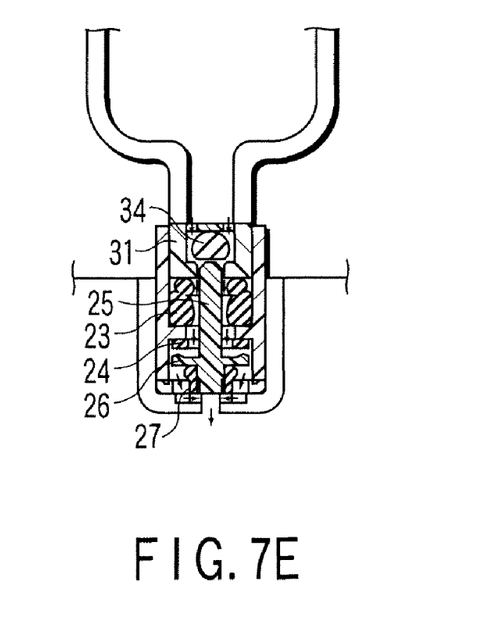
FIG. 7E is a longitudinal sectional view for illustrating the movement of the coupler (the state thereof after the connection) shown in FIGS. 5 and 6.

When the nozzle 10 is pushed into the socket 20 on the occasion of mounting the nozzle 10 on the socket 20, the nozzle body 31 is contacted at first with a fore-end face of the collar 23 to thereby seal the junction between the nozzle body 31 and the housing 21 (FIGS. 7A and 7B). When the nozzle 10 is further pushed into the socket 20, the collar 23 is compressed by the nozzle body 31, thereby enabling the valve stem 25 to impinge against the elastic ball 34 (FIG. 7C) and hence compressing the elastic ball 34 (FIG. 7D). As a result, the channel inside the nozzle is caused to open. When the nozzle 10 is further pushed into the socket 20, the second supporting member 27 is compressed by the elastic ball 34 that has been compressed, thus pushing the valve stem 25 back to the retracted position. As a result, the valve head 26 is moved away from the ring-like packing 24, permitting the channel inside the socket to open (FIG. 7E).

The construction of this example (FIGS. 5-7) is simpler in the structure of the nozzle as compared with the construction of the previous example (FIGS. 2-4), thereby making it possible to further reduce the manufacturing cost of the fuel cartridge.

Incidentally, in the aforementioned examples, they are designed such that the channel inside the nozzle is permitted to open at first and then the channel inside the socket is permitted to open. However, it is also possible to design the coupler such that the channel inside the socket is permitted to open at first and then the channel inside the nozzle is permitted to open. This can be realized by setting the hardness of the movable pin disposed inside the nozzle higher than the hardness of the second supporting member disposed inside the socket or by making the movable pin more elastically deformable in configuration than the second supporting member.

Further, as for the liquid fuel to be employed in the present invention, the liquid fuel is not necessarily limited to methanol but may be selected from various kinds of liquid fuel such, for example, as ethanol fuel such as an aqueous solution of ethanol, pure ethanol, etc.; propanol fuel such as an aqueous solution of propanol, pure propanol, etc.; glycol fuel such as an aqueous solution of glycol, pure glycol, etc.; dimethyl ether; formic acid, etc. These liquid fuels can be optionally selected depending on the features of the fuel cell.

The invention claimed is:

1. A coupler comprising:
a nozzle, and a socket on which the nozzle is to be mounted, the coupler being employed for delivering liquid from the nozzle to the socket and wherein:
the nozzle comprises:
a nozzle body having, at a distal end thereof, a nose portion provided with a nozzle spout;
a movable pin positioned inside the nose portion in such a manner that the pin is enabled to retractably move in the axial direction such that, when the pin is moved to an advanced position, the nozzle spout is closed by the pin to thereby close a channel inside the nozzle and, when the pin is moved to a retracted position, the pin is separated away from the nozzle spout to thereby open the channel inside the nozzle; and
a first supporting member attached to a rear end portion of the movable pin and fixed, through the outer periphery thereof, to the nozzle body, the first supporting member being formed of a flange-shaped elastic material which is configured to push the movable pin toward the advanced position;
the socket comprises:
a cylindrical housing provided, on the inner wall thereof, with an annular rib portion extending diametrically inward;
a collar formed of an elastic material, placed inside the housing and at a region of the housing which is located further out, in the axial direction, than where the annular rib is located, and sustained, through the rear end face thereof, by the outer sidewall of the annular rib;
a ring-like packing placed inside the housing and at a region of the housing which is located further in, in the axial direction, than where the annular rib is located, and sustained, through the rear surface thereof, by the inner sidewall of the annular rib;
a valve stem penetrating through the collar, the annular rib and the ring-like packing and enabled to retractably move in the axial direction;
a valve head attached to approximately the rear end portion of the valve stem and designed to be actuated such that, when the valve stem is moved to an advanced position, the valve head is contacted with the ring-like packing to thereby close a channel inside the socket and, when the valve stem is moved to a retracted position, the valve head is moved away from the ring-like packing to thereby open the channel inside the socket; and
a second supporting member attached to a rear end portion of the valve stem and formed of an elastic material which is configured to push the valve stem toward the advanced position;
wherein the coupler is designed to be actuated such that, when the nozzle is mounted on the socket, the junction between the nozzle body and the housing is sealed by the collar while the movable pin is impinged against the valve stem to thereby push one another back to the retracted positions thereof, and consequently the channel inside the nozzle as well as the channel inside the socket is permitted to open; and an inner surface of the nozzle body, an inner surface of the housing, the movable pin, the first supporting member, the collar, the ring-like packing, the valve stem, the valve head, and the second supporting member are all formed solely of rubber and/or plastics.

2. The coupler according to claim 1, wherein the inner surface of the nozzle body, the inner surface of the housing, the valve stem and the valve head are all formed of at least one kind of resin selected from the group consisting of polyetherether ketone (PEEK), polyphenylene sulfide (PPS), liquid crystal polymer (LCP), polybutylene terephthalate (PBT), polyacetal (POM) and polyethylene terephthalate (PET); and the movable pin, the first supporting member, the collar, the ring-like packing and the second supporting member are all formed of at least one kind of rubber selected from the group consisting of ethylene-propylene-diene (EPDM), acrylonitrile-butadiene rubber (NBR), fluororubber (FKM) and silicone rubber (VMQ).

3. A coupler comprising:

a nozzle, and a socket on which the nozzle is to be mounted, the coupler being employed for delivering liquid from the nozzle to the socket and wherein:

the nozzle comprises:

a nozzle body having, at a distal end thereof, a nozzle spout;

an elastic ball placed in the nozzle body; and a back plate which is fixed to a rear end of the nozzle body and designed to be actuated such that the back plate supports and pushes the elastic ball from the back thereof to force the elastic ball to press onto the nozzle spout to thereby close the channel inside the nozzle;

the socket comprises:

a cylindrical housing provided, on the inner wall thereof, with an annular rib portion extending diametrically inward;

a collar formed of an elastic material, placed inside the housing and at a region of the housing which is located further out, in the axial direction, than where the annular rib is located, and sustained, through the rear end face thereof, by the outer sidewall of the annular rib;

a ring-like packing placed inside the housing and at a region of the housing which is located further in, in the axial direction, than where the annular rib is located, and sustained, through the rear surface thereof, by the inner sidewall of the annular rib;

a valve stem penetrating through the collar, the annular rib and the ring-like packing and enabled to retractably move in the axial direction;

a valve head attached to approximately the rear end portion of the valve stem and designed to be actuated such that, when the valve stem is moved to an advanced position, the valve head is contacted with the ring-like packing to thereby close a channel inside the socket and, when the valve stem is moved to a retracted position, the valve head is moved away from the ring-like packing to thereby open the channel inside the socket; and a second supporting member attached to a rear end portion of the valve stem and formed of an elastic material which is configured to push the valve stem toward the advanced position;

wherein the coupler is designed to be actuated such that, when the nozzle is mounted on the socket, the junction between the nozzle body and the housing is sealed by the collar while the elastic ball is impinged against the valve stem, thereby the elastic ball is compressed and moved away from the nozzle spout and, at the same time, the valve stem is pushed back to the retracted positions thereof, thus enabling the channel inside the nozzle as well as the channel inside the socket to open; and an inner surface of the nozzle body, an inner surface of the housing, the elastic ball, the back plate, the collar, the ring-like packing, the valve stem, the valve head, and the second supporting member are all formed solely of rubber and/or plastics.

4. The coupler according to claim 3, wherein the inner surface of the nozzle body, the back plate, the inner surface of the housing, the valve stem and the valve head are all formed of at least one kind of resin selected from the group consisting of polyetherether ketone (PEEK), polyphenylene sulfide (PPS), liquid crystal polymer (LCP), polybutylene terephthalate (PBT), polyacetal (POM) and polyethylene terephthalate (PET); and the elastic ball, the collar, the ring-like packing and the second supporting member are all formed of at least one kind of rubber selected from the group consisting of ethylene-propylene-diene (EPDM), acrylonitrile•butadiene rubber (NBR), fluororubber (FKM) and silicone rubber (VMQ).

5. A fuel cell comprising:

a socket which is adapted to be connected with a nozzle attached to a fuel cartridge for replenishing a fuel tank of the fuel cell with fuel;

wherein the socket comprises:

a cylindrical housing provided, on the inner wall thereof, with an annular rib portion extending diametrally inward;

a collar formed of an elastic material, placed inside the housing and at a region of the housing which is located further out, in the axial direction, than where the annular rib is located, and sustained, through the rear end face thereof, by the outer sidewall of the annular rib;

a ring-like packing placed inside the housing and at a region of the housing which is located further in, in the axial direction, than where the annular rib is located, and sustained, through the rear surface thereof, by the inner sidewall of the annular rib;

a valve stem penetrating through the collar, the annular rib and the ring-like packing and enabled to retractably move in the axial direction;

a valve head attached to approximately the rear end portion of the valve stem and designed to be actuated such that, when the valve stem is moved to an advanced position, the valve head is contacted with the ring-like packing to thereby close a channel inside the socket and, when the valve stem is moved to a retracted position, the valve head is moved away from the ring-like packing to thereby open the channel inside the socket; and a supporting member attached to a rear end portion of the valve stem and formed of an elastic material which is configured to push the valve stem toward the advanced position;

wherein the socket is designed to be actuated such that, when the nozzle is mounted on the socket, the junction between a distal end of the nozzle and the housing is sealed by the collar while a movable pin built in the nozzle is impinged against the valve stem to thereby push one another back to the retracted positions thereof, and consequently the channel inside the socket is permitted to open; and an inner surface of the housing, the collar, the ring-like packing, the valve stem, the valve head, and the supporting member are all formed solely of rubber and/or plastics.

6. The fuel cell according to claim 5, wherein the nozzle and the socket are constructed such that, when the nozzle is pushed into the socket on the occasion of mounting the nozzle on the socket, a distal end of the nozzle is contacted at first with a fore-end face of the collar and then the collar is compressed by the distal end of the nozzle, thereby enabling the valve stem to impinge against the movable pin in the nozzle and hence pushing the movable pin back to the retracted position to open the channel of the nozzle;

and that, when the collar is subsequently further compressed by the distal end of the nozzle, the valve stem is pushed, by the movable pin, back to the retracted position, thus permitting the channel inside the socket to open.

7. The fuel cell according to claim 5, wherein the inner surface of the housing, the valve stem and the valve head are all formed of at least one kind of resin selected from the group consisting of polyetherether ketone (PEEK), polyphenylene sulfide (PPS), liquid crystal polymer (LCP), polybutylene terephthalate (PBT), polyacetal (POM) and polyethylene terephthalate (PET); and the collar, the ring-like packing and the supporting member are all formed of at least one kind of rubber selected from the group consisting of ethylene-propylene-diene (EPDM), acrylonitrile•butadiene rubber (NBR), fluororubber (FKM) and silicone rubber (VMQ).

8. A fuel cell comprising:

a socket which is adapted to be connected with a nozzle attached to a fuel cartridge for replenishing a fuel tank of the fuel cell with fuel;

wherein the socket comprises:

a cylindrical housing provided, on the inner wall thereof, with an annular rib portion extending diametrically inward;

a collar formed of an elastic material, placed inside the housing and at a region of the housing which is located further out, in the axial direction, than where the annular rib is located, and sustained, through the rear end face thereof, by the outer sidewall of the annular rib;

a ring-like packing placed inside the housing and at a region of the housing which is located further in, in the axial direction, than where the annular rib is located, and sustained, through the rear surface thereof, by the inner sidewall of the annular rib;

a valve stem penetrating through the collar, the annular rib and the ring-like packing and enabled to retractably move in the axial direction;

a valve head attached to approximately the rear end portion of the valve stem and designed to be actuated such that, when the valve stem is moved to an advanced position, the valve head is contacted with the ring-like packing to thereby close a channel inside the socket and, when the valve stem is moved to a retracted position, the valve head is moved away from the ring-like packing to thereby open the channel inside the socket; and a supporting member attached to a rear end portion of the valve stem and formed of an elastic material which is configured to push the valve stem toward the advanced position;

wherein the socket is designed to be actuated such that, when the nozzle is mounted on the socket, the junction between a distal end of the nozzle and the housing is sealed by the collar while an elastic ball which is built in the nozzle is impinged against the valve stem, thereby the elastic ball is compressed and moved away from a nozzle spout and, at the same time, the valve stem is pushed back to the retracted positions thereof, thus enabling the channel inside the nozzle as well as the channel inside the socket to open; and an inner surface of the housing, the collar, the ring-like packing, the valve stem, the valve head, and the supporting member are all formed solely of rubber and/or plastics.

9. The fuel cell according to claim 8, wherein the nozzle and the socket are constructed such that, when the nozzle is pushed into the socket on the occasion of mounting the nozzle on the socket, a distal end of the nozzle is contacted at first with a fore-end face of the collar and then the collar is compressed by the distal end of the nozzle, thereby enabling the elastic ball built in the nozzle to impinge against the valve stem, thus compressing the elastic ball and moving the elastic ball away from the nozzle spout to open the channel inside the nozzle;

and that, when the collar is subsequently further compressed by the distal end of the nozzle, the valve stem is pushed, by means of the elastic ball, back to the retracted position, thus permitting the channel inside the socket to open.

10. The fuel cell according to claim 8, wherein the inner surface of the housing, the valve stem and the valve head are all formed of at least one kind of resin selected from the group consisting of polyetherether ketone (PEEK), polyphenylene sulfide (PPS), liquid crystal polymer (LCP), polybutylene terephthalate (PBT), polyacetal (POM) and polyethylene terephthalate (PET); and the collar, the ring-like packing and the supporting member are all formed of at least one kind of rubber selected from the group consisting of ethylene-propylene-diene (EPDM), acrylonitrile•butadiene rubber (NBR), fluororubber (FKM) and silicone rubber (VMQ).

11. A fuel cartridge comprising:

a nozzle which is adapted to be connected with a socket attached to a fuel cell for replenishing a fuel tank of the fuel cell with fuel;

wherein the nozzle comprises:

a nozzle body having, at a distal end thereof, a nozzle spout;

an elastic ball placed in the nozzle body; and a back plate which is fixed to a rear end of the nozzle body and designed to be actuated such that it supports and pushes the elastic ball from the back thereof to force the elastic ball to press onto the nozzle spout to thereby close the channel inside the nozzle;

wherein the nozzle is designed to be actuated such that, when the nozzle is mounted on the socket, the junction between the nozzle body and the socket is sealed by a collar which is built in the socket while the elastic ball is impinged against a valve stem which is built in the socket, thereby the elastic ball is compressed and moved away from the nozzle spout and the valve stem are pushed back to its retracted position, thus permitting the channel inside the nozzle as well as the channel inside the socket to open; and an inner surface of the nozzle body, the back plate, and the elastic ball are all formed solely of rubber and/or plastics.

12. The fuel cell according to claim 11, wherein the nozzle and the socket are constructed such that, when the nozzle is pushed into the socket on the occasion of mounting the nozzle on the socket, a distal end of the nozzle body is contacted at first with a fore-end face of the collar in the socket and then the collar is compressed by the nozzle body, thereby enabling the elastic ball to impinge against the valve stem in the socket, thus compressing the elastic ball and moving the elastic ball away from the nozzle spout to open the channel inside the nozzle;

and that, when the collar is subsequently further compressed by the nozzle body, the valve stem is pushed, by the elastic ball, back to the retracted position, thus permitting the channel inside the socket to open.

13. The fuel cell according to claim 11, wherein the inner surface of the nozzle body and the back plate are all formed of at least one kind of resin selected from the group consisting of polyetherether ketone (PEEK), polyphenylene sulfide (PPS), liquid crystal polymer (LCP), polybutylene terephthalate (PBT), polyacetal (POM) and polyethylene terephthalate (PET); and the elastic ball is formed of at least one kind of rubber selected from the group consisting of ethylene-propylene-diene (EPDM), acrylonitrile•butadiene rubber (NBR), fluororubber (FKM) and silicone rubber (VMQ).

* * * * *